(12) United States Patent
Pietsch et al.

(10) Patent No.: US 9,592,779 B2
(45) Date of Patent: Mar. 14, 2017

(54) DEVICE AND METHOD FOR CONFIGURING A VEHICLE DEVICE AND METHOD FOR CONFIGURING A VEHICLE

(71) Applicant: VOLKSWAGEN AG, Wolfsburg (DE)

(72) Inventors: Martin Pietsch, Berlin (DE); Dirk Schäfer, Nienhagen (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 14/812,778

(22) Filed: Jul. 29, 2015

(65) Prior Publication Data

US 2016/0052471 A1  Feb. 25, 2016

(30) Foreign Application Priority Data

Aug. 21, 2014 (DE) .................. 10 2014 216 622

(51) Int. Cl.
*B60R 16/037* (2006.01)
*G06Q 30/06* (2012.01)

(52) U.S. Cl.
CPC ....... *B60R 16/037* (2013.01); *G06Q 30/0621* (2013.01)

(58) Field of Classification Search
CPC .................. G06C 30/0621; B60R 16/037
See application file for complete search history.

(56) References Cited

U.S. PATENT DOCUMENTS

| | | | |
|---|---|---|---|
| 6,300,948 B1 | 10/2001 | Geller et al. | |
| 7,457,789 B2 | 11/2008 | Axling | |
| 7,725,299 B2 | 5/2010 | Ramani et al. | |
| 8,417,490 B1 | 4/2013 | Preston et al. | |
| 2003/0130749 A1* | 7/2003 | Haag | G06Q 30/06 700/31 |
| 2009/0187540 A1* | 7/2009 | Richardson | G06F 17/30867 |

FOREIGN PATENT DOCUMENTS

| | | |
|---|---|---|
| DE | 10121682 A1 | 9/2002 |
| DE | 69805818 T2 | 1/2003 |
| DE | 10138174 A1 | 2/2003 |
| DE | 102009019398 A1 | 11/2010 |
| DE | 102009053794 A1 | 5/2011 |
| WO | 03040865 A2 | 5/2003 |
| WO | 2014018219 A1 | 1/2014 |

* cited by examiner

*Primary Examiner* — Yuen Wong

(74) *Attorney, Agent, or Firm* — Barnes & Thornburg LLP

(57) ABSTRACT

A device for configuring a vehicle having an interface for receiving at least one first equipment parameter, desired by a user, of the vehicle. The device includes a data memory for storing permissible vehicle configurations, the permissible vehicle configuration having mutually combinable equipment parameters of the vehicle. The device also includes a processor for predicting a vehicle configuration potentially desired by the user from the permissible vehicle configurations based on a correlation of the first equipment parameter desired by the user and at least one second equipment parameter. The vehicle configuration potentially desired by the user includes the first equipment parameter desired by the user and at least the second equipment parameter.

14 Claims, 4 Drawing Sheets

DEVICE AND METHOD FOR CONFIGURING A VEHICLE DEVICE AND METHOD FOR CONFIGURING A VEHICLE

PRIORITY CLAIM

This patent application claims priority to German Patent Application No. 10 2014 216 622.5, filed 21 Aug. 2014, the disclosure of which is incorporated herein by reference in its entirety.

SUMMARY

Illustrative embodiments relate to devices and methods for configuring a vehicle.

Illustrative embodiments provide a device, a method and a computer program.

BRIEF DESCRIPTION OF THE DRAWINGS

Illustrative embodiments will be described and explained in greater detail with reference to the attached figures in which, in detail.

DETAILED DESCRIPTION OF THE DISCLOSED EMBODIMENTS

Figure 1:
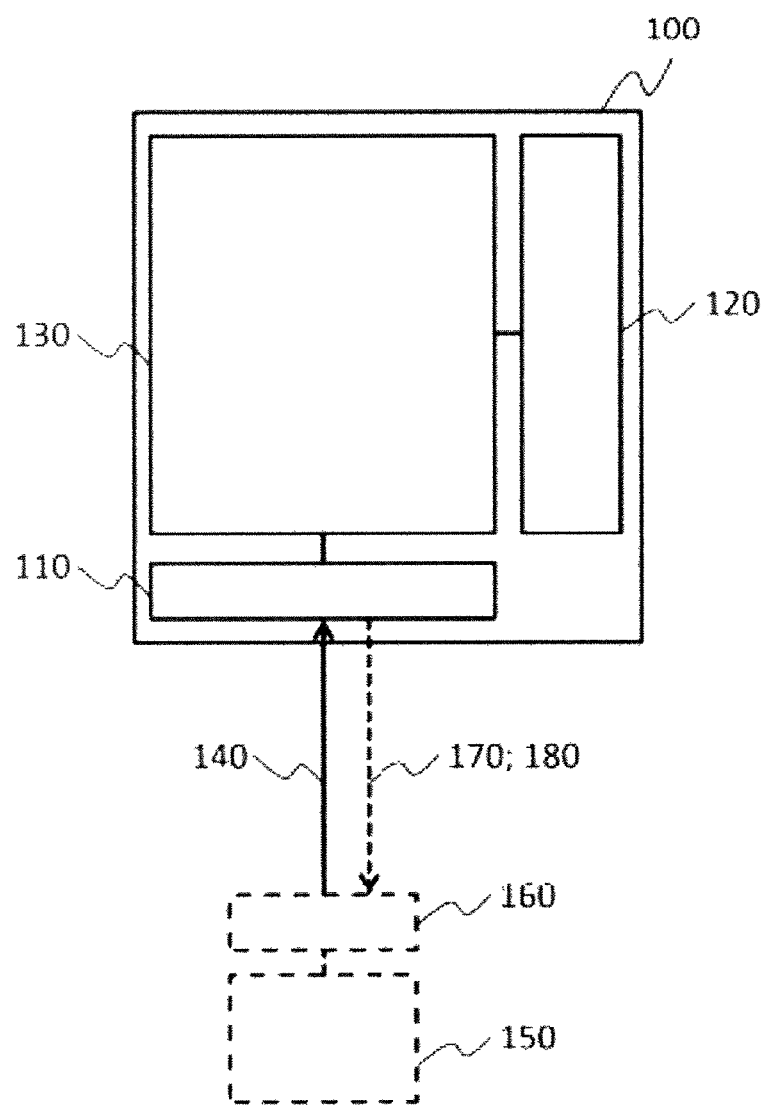
FIG. 1 shows a diagrammatic representation of a device for configuring a vehicle according to at least one illustrative embodiment.

Illustrative embodiments relate to a device for configuring a vehicle. The device comprises an interface for receiving at least one first equipment parameter, desired by a user, of the vehicle. The device also comprises a data memory for storing a plurality of permissible vehicle configurations. A permissible vehicle configuration is characterized by a plurality of mutually combinable equipment parameters of the vehicle. The device also comprises a processor for predicting a vehicle configuration potentially desired by the user from the plurality of permissible vehicle configurations based on a correlation of the first equipment parameter desired by the user and at least one second equipment parameter. In this context, the vehicle configuration potentially desired by the user is characterized by the first equipment parameter desired by the user and at least the second equipment parameter. As a result, a possibility can be created of applying a method to a vehicle configuration which can additionally cause the unwanted, contradictory or impermissible vehicle configurations to be omitted in a selection of a configuration. This may simplify an application for a user. In addition, other possible combinations and thus other vehicle configurations can be determined in a possibly simpler manner. Furthermore, this can lead to an improvement of operational logistics which, in turn, can have time- and cost-saving effects.

In some illustrative embodiments, the processor is also designed to select a stored vehicle configuration which is characterized by the first equipment parameter and the second equipment parameter as the vehicle configuration potentially desired by the user when the correlation of the first equipment parameter and of the second equipment parameter corresponds to a greater value than a correlation of the first equipment parameter and a third equipment parameter. By this means, it may be possible to take into consideration vehicle configurations already selected in the past and their frequency and to predict from this possibly a vehicle configuration desired by the user more precisely.

In some illustrative embodiments, the processor is also designed, in consequence of receiving the first equipment parameter allocated to a first parameter class, to transfer a parameter set, comprising the second equipment parameter, of a second parameter class into a subset, comprising the second equipment parameter, of the parameter set of the second parameter class. This can offer a possibility of delimiting further decision options or circumventing contradictions on the basis of a decision of the user, previously made, for a predefined parameter. In this context, a probability of an impending selection or a technical implementability or a plant-related recommendation can also be taken into consideration. This, in turn, can facilitate a further selection process for the user.

In some illustrative embodiments, the processor is also designed to exclude a further stored vehicle configuration from a prediction if the further stored vehicle configuration is characterized by the first equipment parameter and a further equipment parameter allocated to the second parameter class, excluded from the subset of the parameter set of the second parameter class. This can mean, for example, that a data supplement is allocated to the vehicle configuration which comprises information on a possible constructability, e.g., a number "1" can point to a theoretically possible constructability and a number "0" can point to a theoretically impossible constructability. On the basis of the information on the constructability, e.g. when exhibiting the number 0 in an arbitrary vehicle configuration, an assumption of this configuration can be prevented by the processor 130. In other words, the processor 130 can predict the vehicle configuration potentially desired by the user only from a set of vehicle configurations which have the number 1. Configurations which are possibly not implementable can be excluded in this manner from a further program sequence of a vehicle configurator which can simplify the program sequence.

In some illustrative embodiments, the processor is also designed, in consequence of receiving a third equipment parameter allocated to a third parameter class different from the first parameter class, to transfer the parameter set of the second parameter class into the subset of the parameter set of the second parameter class. Thus, synergy effects of a plurality of parameter selections already made previously by the user may also be taken into consideration for a further selection.

In some illustrative embodiments, the processor is also designed to exclude a further stored vehicle configuration from a prediction if the further stored vehicle configuration is characterized by the first equipment parameter, the third equipment parameter and a further equipment parameter allocated to the second parameter class, excluded from the subset of the parameter set of the second parameter class. Thus, synergy effects of a plurality of parameter choices previously made by the user may also be taken into consideration in such a manner that, as a result, non-implementable configurations or those which, in comparison with others, can have a lack of efficiency, are omitted in a further program sequence.

In some illustrative embodiments, the interface is also designed to provide a query signal with information on the parameter set comprising the first equipment parameter for the user. Thus, a possibility can be offered to present to the user currently available selection options and thus to simplify a use of a vehicle configurator.

In some illustrative embodiments, the processor is also designed to receive a correction signal and, in consequence of the correction signal, change the correlation of the first equipment parameter desired by the user and at least the second equipment parameter. Thus, plant- or sales-related preferences may possibly be taken into better consideration during a selection of equipment parameters.

Some illustrative embodiments also relate to a system comprising a device according to one of the preceding claims and a programmable device. The programmable device comprises a further interface which is designed to provide the first equipment parameter for the interface and to receive the predicted vehicle configuration from the processor. Thus, it can be possible to drive the processor via a further device. In other words, a user can access a vehicle configurator, e.g. from a mobile device or a stationary computer, for example via network.

Illustrative embodiments also relate to a method for configuring a vehicle. The method comprises receiving at least one first equipment parameter, desired by a user, of the vehicle. The method also comprises storing a plurality of permissible vehicle configurations. In this context, a permissible vehicle configuration is characterized by a plurality of mutually combinable equipment parameters of the vehicle. The method also comprises predicting a vehicle configuration potentially desired by the user from the plurality of permissible vehicle configurations on the basis of a correlation of the first equipment parameter desired by the user and at least one second equipment parameter. In this context, the vehicle configuration potentially desired by the user is characterized by the first equipment parameter desired by the user and at least the second equipment parameter. By this means, a method for configuring a vehicle can be created which can have the additional effect that unwanted, contradictory or non-permissible vehicle configurations can be omitted in a selection of a configuration. In addition, further possible combinations, e.g. due to selections made in the past, can be chosen and thus a vehicle configuration desired by the user can be determined in a possibly simpler manner. This may simplify an application for a user.

In addition, further illustrative embodiments also create a program or computer program comprising a program code for performing the following method when the program code is executed on a computer, a processor or a programmable hardware component such as, e.g., an application-specific integrated circuit (ASIC).

Various illustrative embodiments will now be described in greater detail with reference to the attached drawings, in which some illustrative embodiments are shown. In the figures, the thickness dimensions of lines, layers and/or regions may be shown exaggerated for the sake of clarity.

In the subsequent description of the attached figures which show illustrative embodiments, identical reference symbols designate identical or comparable components. Furthermore, combinatory reference symbols are used for components and objects which occur several times in an illustrative embodiment or in a drawing but are described jointly with regard to one or several features. Components or objects which are described with identical or combinatory reference symbols may be designed identically with regard to individual, several or all features, for example their dimensions, but also possibly differently unless something else is obtained explicitly or implicitly from the description.

Although illustrative embodiments can be modified and changed in various ways, illustrative embodiments are shown as examples in the figures and are described in detail here. However, it should be clarified that it is not intended to restrict illustrative embodiments to the forms disclosed in each case but that instead illustrative embodiments should cover all functional and/or structural modifications, equivalents and alternatives which are within the range of the illustrative embodiments. Identical reference symbols designate identical or similar elements throughout the description of the figures.

It should be noted that an element which is designated as being "connected" or "coupled" to another element can be directly connected or coupled to the other element or that there can be intermediate elements present. If, in contrast, an element is designated as "directly connected" or "directly coupled" to another element, no intermediate elements are present. Other terms which are used to describe the relationship between elements should be interpreted in a similar manner (e.g. "between" compared with "directly between", "adjoining" compared with "directly adjoining" etc.).

The terminology which is used herein serves only to describe certain illustrative embodiments and should not restrict the illustrative embodiments. As used herein, the singular forms "one", "an" and "the" should also include the plural forms as long as the context does not specify something else unambiguously. Furthermore, it should be made clear that the expressions such as, e.g. "contain", "containing", "has" and/or "having", "comprises" and/or "comprising" as used herein specify the presence of mentioned features, integral numbers, steps, operating sequences, elements and/or components but do not exclude the presence and/or the addition of one or more features, integral numbers, steps, operating sequences, elements, components and/or groups.

As long as nothing else is defined, all terms used herein (including technical and scientific terms) have the same meaning which is ascribed to them by the average expert in the field to which the illustrative embodiments belong. It should also be clarified that expressions, e.g. those which are defined in generally used dictionaries, should be interpreted in such a manner as if they had the meaning which is consistent with their significance in the context of the relevant technology and should not be interpreted in an idealized or excessively formal sense unless that is expressly defined herein.

According to conventional solutions, a logic of a vehicle configurator can be based on a trial-and-error approach which can begin, for example, with a choice of an engine-transmission combination. A choice of further packets or characteristics can only be made following this. In this context, problems may occur in respect to the fact that the user maneuvers himself abruptly into "dead ends" of the configurator due to technical and/or sales-related constraints. In other words, multi-stage processes of conventional configurators can often lead at a later point in time to a compulsive deselection of a characteristic originally selected which, in turn, can complicate or disturb the entire process. A logic of a conventional configurator can thus lead to constraints in the process without first demonstrating an alternative to the user. For example, the user can be confronted with the choice of a spare wheel already on entry and there may not be an alternative. In addition, an arbitrary user may have individual priorities in choosing the characteristics from the configurators. However, it may be necessary that the user firstly decides for an actual model and configures it fully completely. If then different pieces of equipment or even different models are considered by the user, it may also be necessary that this process is repeated correspondingly frequently; for example also if the user has maneuvered himself into a "dead end" described above. An individual equipment parameter (e.g. number of seats, boot volume or the existence of a trailer coupling) may be more important to the user than the actual model itself, however. In most cases, such flexible or complex requests can only be served unsatisfactorily by conventional vehicle configurators. Thus, for example, listing of fully specified possible vehicles by means of the priorities of the user cannot be supported. Thus, it may not be possible to offer consistent or actually orderable combinations of other characteristics or also fully specified vehicles, which, for example, have also already been selected by other users with a high probability, to the user on the basis of his decisions hitherto made. Similarly, it may not be possible to influence a weighting of particular characteristics in a presentation on the sales side, e.g. before or during the vehicle configuration. A complicated and inefficient presentation of a plurality of offers for the user in build-to-order markets (BTO) can be a further consequence.

This may be undesirable, for example, if high individualization of a vehicle desired by a user is aimed for. In conventional vehicle configurators, only a basic model can be used as a basis which can be extended or modified by further characteristics. To decide which characteristics are constructible in a current configuration, a simulation with each individual ones of these characteristics can be started, for example, and it can be checked whether a direct breach of rules arises. Breaches of rules which only occur transitively can remain disregarded, however (so-called "dead ends" or "cycles"). If a breach of rules occurs later, it can be attempted only via further simulations to demonstrate alternatives. However, even these alternatives can in turn lead into dead ends (false-positive statement). Due to these false-positive statements relating to the constructability of the characteristics concerned, additional time consumption may arise for the user in finding a completely specified vehicle by trial. According to conventional methods, it may also be the case that the user did not get to a vehicle specified according to his wishes within a predetermined time since an output of false-positive results and the only later reconfiguring to "constructible" characteristics within the predetermined time can lead to an endless loop.

This may possibly be corrected by so-called constraint solvers in that, optimized by various heuristics, they propagate the "constraints" of the current vehicle configuration completely. In this way, it can be possible to decide in advance whether a "dead end" or a "cycle" is produced. In the case of constraint solvers, however, it may not be possible to predict the duration of a calculation and this may possibly increase exponentially.

A so-called "collaborative filtering" may enable purchase recommendations for other equipment parameters to be demonstrated to users in selection of particular equipment parameters. For this purpose, it is possible to look, e.g., in a sales history, to see which articles have been selected/ purchased by other users after they had already decided for a first article. However, this approach can neglect to consider that dependences/restrictions/constraints may exist between the articles or equipment parameters and these restrictions can even change with time.

It is possible to use so-called Markov networks for modeling conditional probabilities in different applications of the artificial intelligence. A Markov network, also called Markov chain or Markov process, is a stochastic process. A Markov chain is defined by the fact that, by knowledge of a limited prehistory, similarly good prognoses about a future development are possible as with knowledge of the entire prehistory of the process. For example, Markov networks can be used for providing for a preview of a future demand in components by means of historic (vehicle) orders.

Illustrative embodiments are, therefore, related to a device 100, shown in FIG. 1, for configuring a vehicle. The device 100 comprises an interface 110 for receiving at least one first equipment parameter 140, desired by a user, of the vehicle. The device 100 also comprises a data memory 120 for storing a plurality of permissible vehicle configurations. A permissible vehicle configuration is characterized by a plurality of mutually combinable equipment parameters of the vehicle. The device 100 also comprises a processor 130 for predicting a vehicle configuration potentially desired by the user from the plurality of permissible vehicle configurations based on a correlation of the first equipment parameter 140 desired by the user and at least one second equipment parameter. In this context, the vehicle configuration potentially desired by the user is characterized by the first equipment parameter 140 desired by the user and at least the second equipment parameter.

The interface 110 can be a wire-connected or wireless interface. The first equipment parameter 140 can comprise information on a feature, attribute, desired or selected by a user, or an article associated with the vehicle. This can include characteristics of a component used for an operation of the vehicle, e.g. an engine, transmission or tire type or optional equipment, e.g. electrical window lifters or a driving assistance system or also attributes such as a chassis color or a material of a seat cover. The data memory 120 can be arranged internally or externally of the processor 130. The second equipment parameter can comprise, for example, information on a feature, attribute or an article associated with the vehicle, already previously selected by the user or selectable by the user in future.

The plurality of permissible vehicle configurations can comprise all permissible or constructible vehicle configurations. Same vehicle configurations can correspond in each case to a total configuration, or, in other words, a completely configured vehicle.

The correlation of the first equipment parameter 140 and the second equipment parameter can be comprised by a vehicle configuration currently present. The vehicle configuration currently present can correspond to an advance of a configuration process performed by the user and represent a part-configuration of a vehicle. Or, in other words, the first equipment parameter 140 can be combinable with the second equipment parameter and lead to a permissible overall configuration of a vehicle. A vehicle configuration or part-configuration can also be characterized via at least the first equipment parameter 140. Furthermore, further equipment parameters can exist which, in combination with the first equipment parameter 140, can lead to an impermissible overall configuration of a vehicle. A permissible configuration can be, for example, a combination offered by a manufacturer or constructible combination of equipment parameters (also briefly called "parameters" in the text which follows).

Taking into consideration a correlation between the first parameter and the second parameter, it is possible to calculate a probability for a vehicle configuration. For example, after selection of the first parameter by the user, a probability of transition to a vehicle configuration can be calculated which is characterized by the first parameter and the second parameter still selectable by the user in future. The transition probability can thus reproduce a probability of a transition of a vehicle configuration characterized at least partially by the first parameter to a vehicle configuration characterized at least partially by the first and the second parameter.

In some illustrative embodiments, the processor is also designed to select a stored vehicle configuration which is characterized by the first equipment parameter and the second equipment parameter as the vehicle configuration potentially desired by the user when the correlation of the first equipment parameter and of the second equipment parameter corresponds to a greater value than a correlation of the first equipment parameter and a third equipment parameter.

A correlation can be a relationship or a dependence. The correlation can, e.g., produce the value, change it or be given by it. The value can correspond to a conditional probability and be, e.g., a numerical value of the conditional probability. The conditional probabilities can thus be, e.g., transition probabilities starting from a vehicle configuration (FK 1) characterized by the first parameter. The second and the third equipment parameters can be, for example, alternative with respect to one another. Accordingly, there can be a vehicle configuration (FK 1.2) which is precisely characterized by the first and the second parameter and, alternatively, a vehicle configuration (FK 1.3) which is precisely characterized by the first and the third parameter. The first probability value corresponding to the transition from (FK 1) to (FK 1.2) can then be higher than the second probability value corresponding to the transition from (FK 1) to (FK 1.3). In this case, (FK 1.2) can be predicted by the processor as a vehicle configuration potentially desired by the user. In this context, (FK 1.2) and (FK 1.3) can be stored in the data memory and the corresponding probability value can be allocated to them by the processor. In this context, a probability value can change dynamically or, in other words, be changed by the processor in accordance with a current vehicle configuration (part-configuration), a current progress in a configuration sequence or another value. The further value can correspond, e.g., to a frequency with which a vehicle configuration (e.g. part-configuration or also total configuration) has been assumed in the past. In the past can here mean a predefined period t which comprises, for example, at least one year and/or ends in the present. The frequency, in turn, can correspond to a number of vehicles with the corresponding vehicle configuration previously sold. Again, in other words, the processor can predict such a vehicle configuration as that potentially desired by the user which, in comparison with other vehicle configurations, is allocated to a higher probability value.

In some illustrative embodiments, the processor 130 first checks whether a vehicle which corresponds to an arbitrary total configuration with the first equipment parameter 140 is constructible. Non-constructible total configurations may possibly be excluded. Constructible total configurations stored in the data memory 120 can still be allocated probability values by the processor 130 which comprise, e.g., information about a frequency with which these vehicle configurations have been assumed in the past. The probability values can even be equal to zero which can correspond to a vehicle previously never ordered or sold by a user. In some illustrative embodiments, such a vehicle configuration may previously not have been stored in the data memory 120 as yet and prestored only in consequence of an assumption of this vehicle configuration by the processor 130. Furthermore, probability values can also be allocated to combinations of a number of further equipment parameters or to a single equipment parameter.

The conditional probability can thus be influenced by a sales history. In other words, a vehicle configuration assumed in the past can influence the correlation. For example, a first correlation between a red outer color and a 180 HP engine can correspond to a greater value than a second correlation between a green outer color and a 180 HP engine. An interaction of equipment parameters in the first correlation can thus correspond to an interaction of equipment parameters in the second correlation as a result of which the conditional probabilities corresponding to the correlations can initially be equal for both outer colors. However, vehicle configurations desired by the user from the past can point, e.g., to a preference for a red outer color in vehicles having engine powers from 150 HP. By this means, a conditional probability for the second equipment parameter (e.g. red outer color) can be increased on the basis of the first equipment parameter already selected by the user (e.g. 180 HP engine).

A currently made decision of the user for the second equipment parameter can in turn influence the correlation between the first and second equipment parameter in the case of a future assumption of the vehicle configuration characterized by the first equipment parameter. Thus, it can also be possible that the correlation in the case of a current utilization by a current user corresponds to a different value than in the case of a future utilization by a future user. However, it can also be possible that a vehicle previously not sold as yet is proposed as a vehicle configuration potentially desired by the user. A total or part-configuration corresponding to this vehicle can then be allocated even a probability value of zero.

Furthermore, a system constraint by the plant or an efficiency of a synergy between a first and a second or third equipment parameter can influence the correlation. For example, a first equipment parameter, e.g. a spoiler or widened tire in combination with a second equipment parameter, e.g. a 150 HP engine, can form a more efficient combination for a user than with a third equipment parameter, e.g. a 60 HP engine, although both combinations could be constructible in accordance with a theoretical consideration. The conditional probability for a vehicle configuration characterized by the second equipment parameter can accordingly be higher than the conditional probability for a vehicle configuration characterized by the third equipment parameter.

In addition, a current offer of components or materials can influence a correlation. If, for example, an offer of a predetermined driving assistance system is higher than a current demand for the driving assistance system, a conditional probability for a vehicle configuration having the driving assistance system can be correspondingly increased. If the offer is less, the probability can be correspondingly reduced. For this purpose, the processor can have an input interface which is designed to receive a correction signal. The correction signal can effect a change of a value corresponding to the correlation. The correction signal can be provided optionally by a further user, e.g. via a corresponding input device or an external programmable device (from the sales side, in other words).

In some illustrative embodiments, the processor is also designed, in consequence of receiving the first equipment parameter allocated to a first parameter class, to transfer a parameter set, comprising the second equipment parameter, of a second parameter class into a subset, comprising the second equipment parameter, of the parameter set of the second parameter class. For example, a parameter class can represent a precharacterizing clause, e.g. "engine power". Furthermore, a parameter set can comprise a number of mutually optional selection possibilities, e.g. "60 HP", "100 HP", "150 HP", etc. In this context, a selection possibility corresponds to an equipment parameter. Accordingly, the subset can comprise a number of mutually optional and currently permissible selection possibilities. A permissibility can then be due to a previously made selection (of the first parameter). Thus, for example, a predefined engine type can delimit a selection of various types of transmission.

Figure 2:
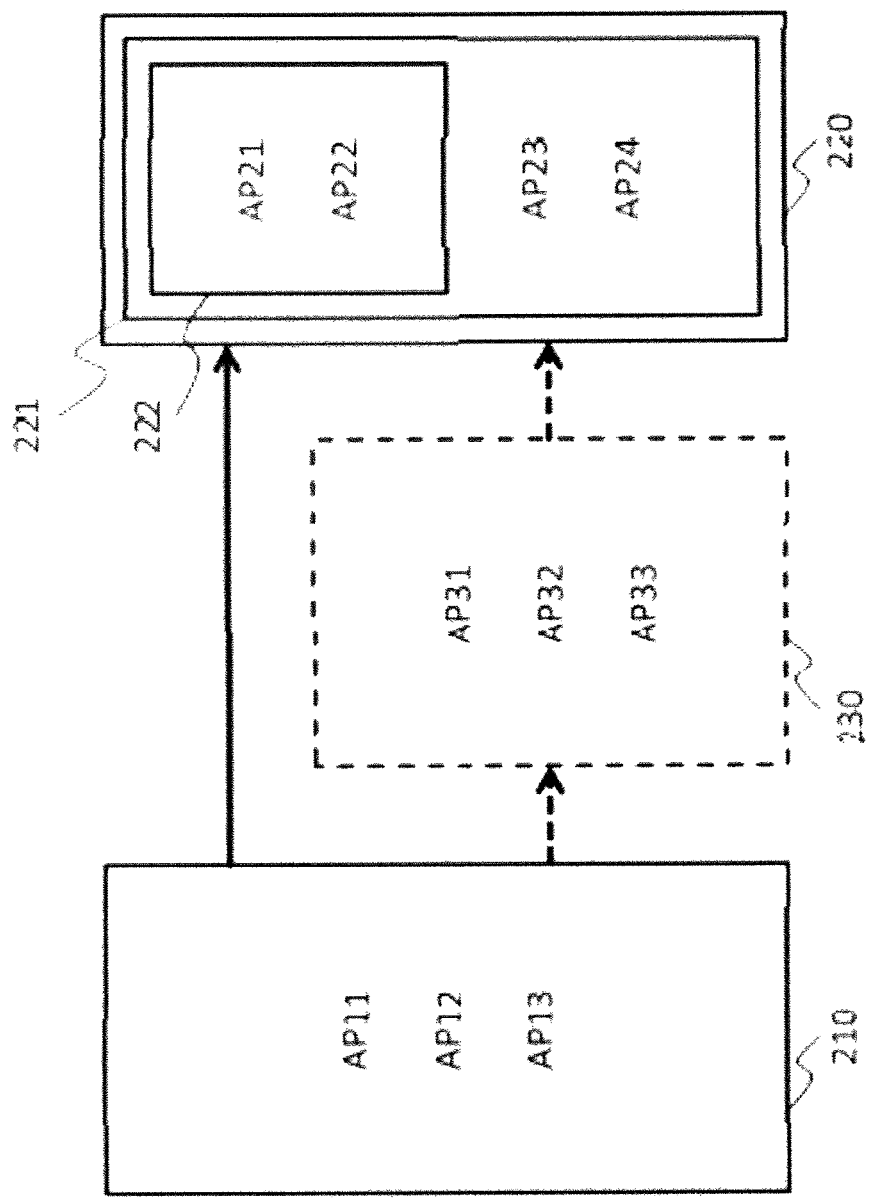
FIG. 2 shows a diagrammatic representation of a configuration sequence according to at least one illustrative embodiment.

This is illustrated diagrammatically in FIG. 2. Parameters AP11, AP12 and AP13 are allocated to the first parameter class 210. Parameters AP21, AP22, AP23 and AP24 are allocated to the second parameter class 220. Before a selection of a parameter of the first parameter class 210, a parameter set 221 can initially comprise parameters AP21, AP22, AP23 and AP24. If A11 has been selected, the parameter set 221, e.g., can be transferred into subset 222 which only comprises parameters AP21 and AP22.

The processor is designed to exclude a further stored vehicle configuration from a prediction if the further stored vehicle configuration is characterized by the first equipment parameter, e.g. AP11, and a further equipment parameter allocated to the second parameter class, excluded from the subset of the parameter set of the second parameter class, e.g. AP23. This can mean, for example, that a data supplement is allocated to the vehicle configuration which comprises information on a possible constructability; e.g., a number "1" can point to a theoretically possible constructability and a number "0" to a theoretically impossible constructability. On the basis of the information on the constructability, e.g. when exhibiting the number 0 in the case of an arbitrary vehicle configuration, and an assumption of this configuration by the processor can be prevented. In other words, the processor can predict the vehicle configuration potentially desired by the user only from a set of such vehicle configurations which have the number 1.

Thus, vehicle configurations which are characterized by the parameters AP11 and AP21 or by AP11 and AP22 can have in each case a data supplement with information on an existing constructability. In other words, a vehicle configuration which is characterized by AP11 and AP23 can then, for example, have a data supplement with information on a constructability which is not given. Alternatively, in other illustrative embodiments, the parameter set 221 can be transferred, in consequence of a selection of AP12, into another subset which only comprises AP22, AP23 and AP24, or still remain unchanged in the case of a selection of AP13.

Furthermore, optional features are shown in FIG. 2 by dashed lines and arrows. Thus, in some illustrative embodiments, the processor is also designed, in consequence of receiving a third equipment parameter allocated to a third parameter class 230 different from the first parameter class 210, to transfer the parameter set 221 of the second parameter class 220 into the subset 222 of the parameter set 221 of the second parameter class 220. In other words, the parameter set 221 can remain unchanged after a selection of AP11, AP12 or AP13 and, for example, a combination of AP11 and AP31 can effect the transfer into the subset 222. Alternatively, a combination of AP12 and AP31 cannot effect a restriction but a combination of AP12 and P32 can effect the transfer. In other words, the transfer can be effected by a combination of two parameters which are allocated to different parameter classes. Correspondingly, a vehicle configuration which is characterized by the combination (e.g. AP12 and AP32) and a parameter excluded from the subset 222 (e.g. AP24), can obtain a data supplement with information on a constructability which is not given.

In one illustrative embodiment, the parameter classes shown in FIG. 2 can be provided for the user as a selection menu. On selection of a parameter of the first parameter class 210, a query signal relating to a choice of a parameter of the second or third parameter class (220; 230) can be output by the processor to a device allocated to the user and, for example, thus provided for the user.

For this purpose, there can be a system provided as is shown in FIG. 1. Dashed lines and arrows again indicate optional components. The system comprises the device 100 and a programmable device 150 allocated to the user. The programmable device 150 has a further interface 160 which is connected to the interface 110 wirelessly or in a wire-connected manner. In other words, signals can be exchanged between the interface 110 and the further interface 160. The further interface 160 can be arranged internally or, as shown in FIG. 1, externally to the programmable device 150. The programmable device 150 can be designed to provide the first equipment parameter 140 to the interface 110 and to receive the predicted vehicle configuration 170 or a query signal 180 with information on the parameter set comprising the first equipment parameter from the processor 130. The programmable device 150 can be, e.g., a computer, laptop, smart phone, tablet or a further mobile device. The device 100 can be, e.g., a data server or a central computer. A data exchange of the interface 110 with the further interface 160 can take place, e.g. via Internet.

Figure 3:
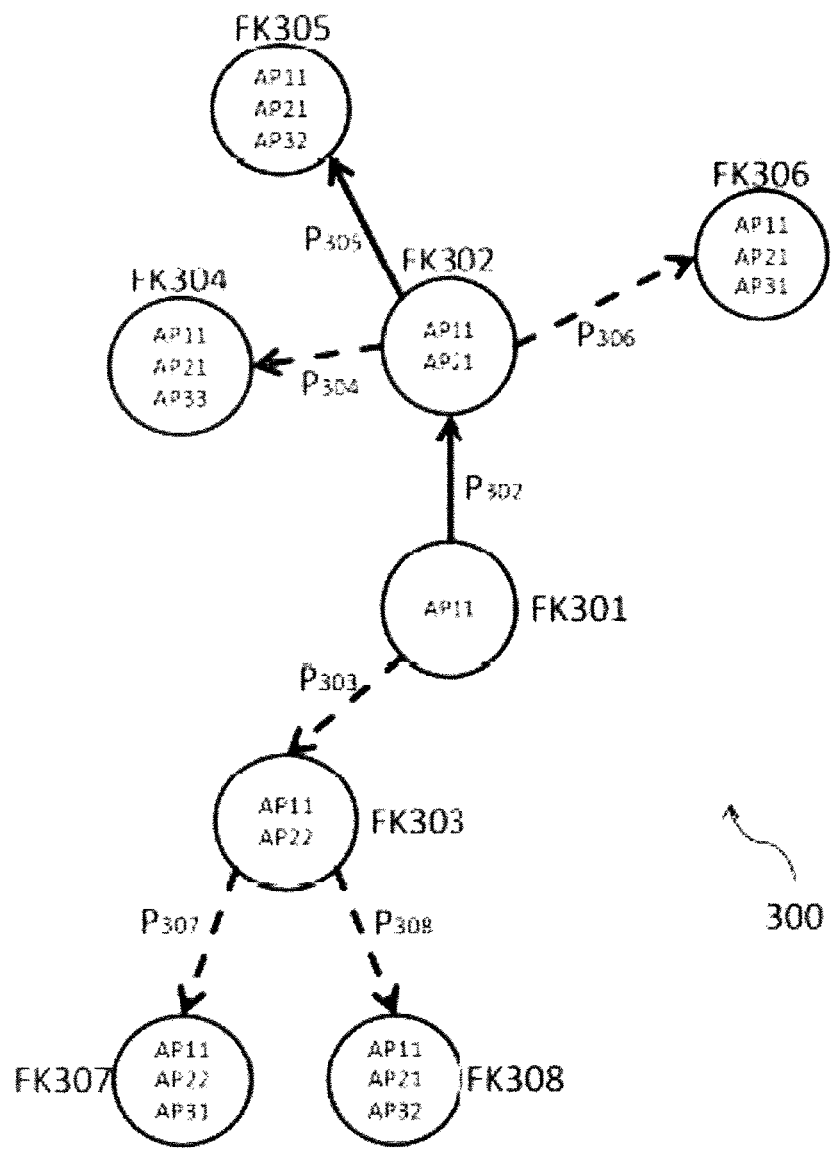
FIG. 3 shows a diagrammatic representation of a network for determining probabilities according to at least one illustrative embodiment.
Figure 4:
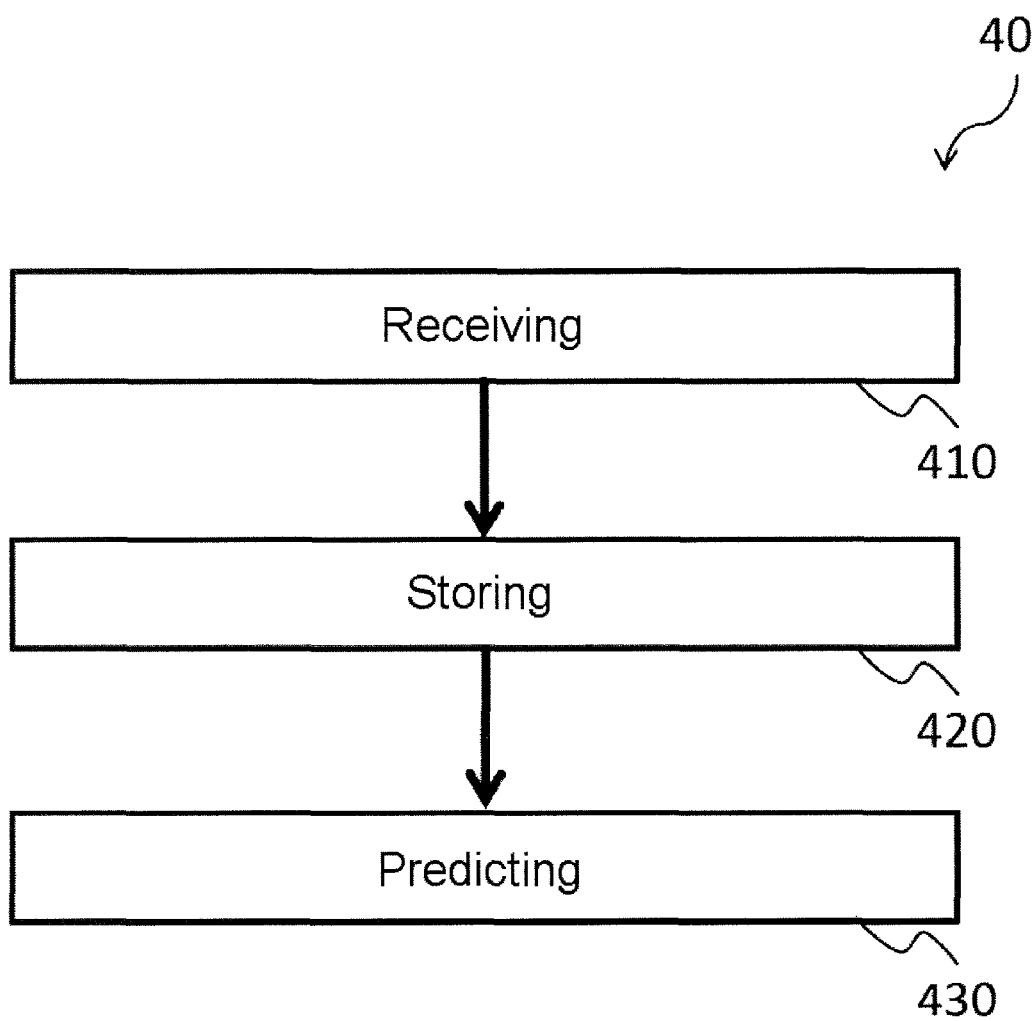
FIG. 4 shows a flowchart of a method according to at least one illustrative embodiment.

FIG. 3 shows a Markov network 300 which can be used for determining a vehicle configuration potentially desired by the user. In other words, the Markov network 300 can be used as platform for a product or vehicle configurator. In this context, a vehicle configuration represents a state in the Markov network 300. FK301 to FK308 identify various vehicle configurations and AP11, AP21, AP22, etc. identify the respective equipment parameters which characterize them. The starting point is here an arbitrary vehicle configuration 301. Vehicle configuration 301 is characterized by the first parameter AP11. Starting from this, further parameters can be selected by the user which in each case lead to FK302 or FK303. In this context, P302 is the probability of transition to FK302 and P302 is the probability of transition to FK303. In the text which follows, P302>P303 which is illustrated by a continuous arrow for P302 and a dashed arrow for P303, and P302, P303 are in each case unequal to zero. The processor can now predict FK302 as the vehicle configuration potentially desired by the user due to the higher probability of transition. But the user can still render a decision for equipment parameter AP22 and convey a corresponding input signal to the processor. In this case, the processor can determine probabilities for subsequent decisions or, in other words, the transition probabilities P307 and P308 for FK307 and FK308 on the basis of the choice of the parameter AP22. Furthermore, the user can even select FK303 for another case in which P303 is equal to zero. Optionally, information on the constructability of a further vehicle configuration can change in the case of a decision of a user for a given vehicle configuration or, in other words, in consequence of a selection of a parameter, last made by the user, be no longer constructible as is described by means of FIG. 2.

If, in contrast, the user selects AP21 as further equipment parameter, the processor can assume the vehicle configuration FK302 as the current state and determine the transition probabilities P304, P305 and P306 for FK304, FK305 and FK306 or correct transition probabilities already determined for these vehicle configurations. The transition probabilities P304, P305 and P306 can thus represent conditional probabilities in the case of which the occurrence of the state FK302 is already presupposed. Similarly, the transition probabilities P307 and P308 can thus represent conditional probabilities in the case of which the occurrence of the state FK303 is presupposed. On the basis of FK302, P305>P306>P304 and P304=0 can for example apply. In other words, FK305 represents in this case the vehicle configuration predicted by the processor, potentially desired by the user, and FK306 represents a further option. In this context, FK304 can represent a vehicle combination which has never been chosen in the past as a result of which the processor calculates its probability as zero. For example, a redundant or inefficient combination of equipment parameters can lead to a transition probability of zero for this vehicle configuration. In contrast, a configuration selected more frequently compared with another vehicle configuration in the past can lead to calculation of an increased transition probability, similarly when a potentially desired configuration is characterized by an equipment parameter which could be combined efficiently with a parameter already selected (in other words, a user may desire a greater rated width of the tires, e.g. in the case of the choice of a comparatively high-powered engine).

In addition, further illustrative embodiments can be implemented optionally or alternatively which are shown here only by way of example and in no way restrictively. According to one illustrative embodiment, parameterization of a probability distribution can depend at least partially on an input signal of a user. In this context, there can be a dynamic adaptation of transition probabilities. The input signal can comprise, e.g., information on a user preference which, in turn, forms a correlation with a group of equipment parameters. The group of equipment parameters can then comprise a number of parameter classes and increase a transition probability to a vehicle configuration which is characterized by an equipment parameter from the group. In other words, the user preference can be a "soft criterion" such as, e.g., "sporty" which increases the probabilities for comparatively large engines, sports chassis or sports seats.

In the case of the Markov network, conditional probabilities of dependent characteristics (e.g. DSG transmission, rocker switches at the steering wheel, etc.) can then also be transitively calculated or corrected in an ongoing illustrative embodiment. Furthermore, the user preference can also be provided via a further computer connected to the processor. This further computer can be, for example, a further data server, and determine the customer preference, e.g., on the basis of a social media profile, a web tracker, a customer history etc.

Moreover, in further illustrative embodiments, the processor can be designed to provide a visualization signal to a user-programmable device. The visualization signal can initiate a visual representation of the vehicle configuration potentially desired by the user by the programmable device in such a manner that the visual representation appears three-dimensionally for the user or, in other words, initiate a rendering of the representation. Alternative proposals can be provided optionally for the user. This may simplify a selection for the user.

Furthermore, a predicted vehicle configuration can correspond to an already prefabricated vehicle (store vehicle). The processor can be designed optionally to provide an availability signal for the user. In other words, a notice comprised of the availability signal can point out that this vehicle is already available. The method can be used in product or vehicle configurators both Internet-supported (online) in a show room and at a sales workstation for supporting a seller in a search for suitable products or vehicle models.

According to a further aspect, illustrative embodiments relate to a method 400 for configuring a vehicle. The method 400 comprises receiving 410 at least one first equipment parameter, desired by a user, of the vehicle. The method 400 also comprises storing 420 a plurality of permissible vehicle configurations. In this context, a permissible vehicle configuration is characterized by a plurality of mutually combinable equipment parameters of the vehicle. The method 400 also comprises predicting 430 a vehicle configuration potentially desired by the user from the plurality of permissible vehicle configurations on the basis of a correlation of the first equipment parameter desired by the user and at least one second equipment parameter. In this context, the vehicle configuration potentially desired by the user is characterized by the first equipment parameter desired by the user and at least the second equipment parameter. By this means, a method for configuring a vehicle can be created which can have the additional effect that unwanted, contradictory or impermissible vehicle configurations can be omitted in a selection of a configuration. In addition, further combination possibilities, e.g. on the basis of selections made in the past, can be determined and thus a vehicle configuration desired by the user can be determined in a possibly simpler manner. This may simplify an application for a user.

By using the Markov network diagrammatically shown, for example, in FIG. 3, on a product or vehicle configurator, characteristics and dependences of a program of offers can be mapped in a consistent structure and an efficiency of a configuration process possibly improved. With the aid of the Markov network, vehicle configurations potentially desired by the user can be output as purchase recommendations which are inherently constructible. False-positive statements relating to a constructability can thus be avoided. In addition, cycles and dead ends of a configuration process sequence can be avoided since the constructability of other characteristics can be determined directly on the basis of the current configuration. By means of this so-called "complete propagation", direct and indirect constraints without alternatives can also be resolved.

In one illustrative embodiment, the user can firstly select an arbitrary entry point into the configuration independently of equipment parameters and the processor, in response to the selected entry point, can provide information relating to the potentially desired vehicle configurations or, in other words, offer, e.g., suitable vehicles spanning model groups. By means of individual requirements (selectable as equipment parameters) or conditions of the user, the latter can thus progressively restrict the program of offers and get to the vehicle configuration desired by him. A possibly superfluous configuring of a number of models on a fixed path can possibly be circumvented in this case. In this context, it may also be possible to calculate, and possibly restrict, non-discrete characteristics such as, e.g., a $CO_2$ emission, a boot volume, a maximum speed, etc. consistently.

The vehicle configuration potentially desired by the user can be calculated on the basis of an overall probability distribution. Conventional systems could only consider the individual probabilities independently of one another. By means of illustrative embodiments, e.g., proposals of combinations of characteristics can be avoided in the case of which, although in each case the installation rates or probabilities of the individual characteristics were comparatively high in the history, the combination of these characteristics was selected comparatively rarely in its totality, however.

In some illustrative embodiments, the processor is also designed to receive a correction signal and, in consequence of the correction signal, change the correlation of the first equipment parameter desired by the user and at least of the second equipment parameter. In other words, in the case of a change of individual probabilities, effects on further dependent probabilities can be taken into consideration, for example by means of Markov networks, and these probabilities can be adapted during the configuration process. In this manner, it can also be rendered possible to have a sales-related, arbitrary, possibly consistent influence on a vehicle configuration presented as purchase recommendation, potentially desired by the user. For example, an excessive offer of components can thus be taken into consideration or a further selection possibility can be pointed out to the user.

In some illustrative embodiments, relationships of the equipment parameters with one another can also be derived from a predetermined technical or sales-related set of rules. Optionally or additionally, a structure with the installation rates of the past (in other words vehicle configurations desired by other users in the past) can be stored. From the Markov network based thereon, partially or fully specified construction orders can be generated. In this manner, e.g., store vehicles can also be generated for build-to-stock markets (BTS).

By means of illustrative embodiments, it can be possibly achieved that resources are utilized better or even optimally, a configuration process is made to be more efficient and this could possibly lead to time and cost savings for the user, sales or logistics. Furthermore, additive or synergistic effects of a number of equipment parameters can be better considered and thus, under certain circumstances, an improved or even optimal use of resources or also time or cost savings can take place. Illustrative embodiments can offer a possibility of a use independent of a respectively predominant sales model or also a more efficient customer address or sales control, also in other markets.

Illustrative embodiments may possibly offer the user a more intuitive possibility of determining a product or vehicle desired by him directly in a constructible and time-saving manner by means of his inputs. In this context, recommendations of vehicle configurations can be provided dynamically for the user on the basis of configurations of other users selected in the past or a potentially desired, completely specified and constructible product or vehicle can be calculated directly. Furthermore, it is also possible for the sales side to have an influence on a prediction of a vehicle configuration potentially desired by the user which may lead to an improved propagation of an offer to the user. In addition, a logistic of vehicle parts, vehicle construction or orders may be improved or optimized optionally also in the case of other products or parts thereof.

By means of illustrative embodiments, a presence of predetermined characteristics of a vehicle (e.g. equipment, colors) can be controlled via a probability distribution in a Markov network. Initially, a current probability distribution can be used as a basis from a sales history. However, it is also possible to build up, e.g., on individual plan specifications etc. Dependencies of the probability of an equipment parameter with respect to probabilities of other equipment parameters can be considered consistently, e.g. dependences on a navigation system, a radio or a multifunction steering wheel with respect to one another. The network can operate in the real-time domain which can increase an operating speed.

The features disclosed in the foregoing description, the subsequent claims and the attached figures can be of significance and implemented in their various embodiments both individually and in arbitrary combination for implementing an illustrative embodiment.

The illustrative embodiments described above only represent an illustration of the principles of the present embodiments. Naturally, modifications and variations of the arrangements and details described herein will be obvious to other experts. It is intended, therefore, that the disclosed embodiments be restricted only by the scope of the following patent claims and not by the specific details which have been presented here by means of the description and the explanation of the illustrative embodiments.

To support a user in selecting a vehicle at a vehicle provider, product configurations are used in many cases which can operate on computer systems of the provider. In spite of support by the system, product configuration processes can have termination rates initiated by the user. The reason for this can be partially that certain step sequences during the process can lead to configuration states which exhibit a logical contradiction or are subject to a restriction with respect to producibility.

To avoid this, predefined vehicle configurations can be offered to a user in accordance with a conventional solution. In practice, however, the combination of these packets again leads to conflicts. For markets for series-produced models (BTS markets), vehicle configurations can hitherto be generated on the basis of sales figures or sales-related experience. Support by the system for automatic configuration based on statistics cannot be given in this context, however.

Furthermore, algorithms for resolving constraints (solvers) can be used in accordance with a conventional solution. However, these cannot predict a timespan of a calculation and the timespan may accordingly rise possibly exponentially. At the most, this problem can be diminished by using suitable heuristics.

Even if it is possible in this way to counter configuration states which force a termination by the user due to a contradiction or a restriction, recommendations by the provider relating to further characteristics based on conditional probabilities may not be possible anymore. Information on dependences or restrictions between individual equipment parameters (e.g. features, articles or attributes of a vehicle) and a possible change of those with time may remain disregarded in this context. For this reason, e.g., recommendations may be pronounced which are possibly not constructible.

Consequently, it is desirable to improve a concept for taking into consideration available information by motor vehicle configurations and to simplify a sequence of a configuration process.

LIST OF REFERENCE DESIGNATIONS

100 device
110 interface
120 data memory
130 processor
140 first equipment parameter
150 programmable device
160 further interface
210 first parameter class
220 second parameter class 221 parameter set
222 subset
230 third parameter class
300 Markov network
400 method
410 receiving
420 storing
430 predicting

The invention claimed is:

1. A device for configuring a vehicle, the device comprising:
an interface device to receive at least one first equipment parameter input by a user of the vehicle;
a data memory to store a plurality of permissible vehicle configurations and corresponding vehicle models that have the plurality of permissible vehicle configurations, each of the plurality of permissible vehicle configurations having a plurality of mutually combinable vehicle equipment parameters; and
a processor to predict a vehicle configuration to be selected by the user from the plurality of permissible vehicle configurations based on a correlation of the at least one first equipment parameter input by the user and at least one second equipment parameter, the vehicle configuration to be selected by the user having the first equipment parameter input by the user and the at least one second equipment parameter,
the processor controls the prediction based on predetermined dependencies via a probability distribution of vehicle equipment parameters comprising at least one of a navigation system, a radio, and a multifunction steering wheel,
wherein the processor selects a stored vehicle configuration having the first equipment parameter and the second equipment parameter as the vehicle configuration to be selected by the user in response to a correlation value of the first equipment parameter and the at least one second equipment parameter corresponding to a greater transition probability value than a correlation value of the first equipment parameter and a third equipment parameter, and
wherein the processor further generates a visual representation of the predicted vehicle configuration along with alternative vehicle configuration proposals.

2. The device of claim 1, wherein the processor, in response to receipt of the first equipment parameter allocated to a first parameter class, transfers a parameter set comprising the at least one second equipment parameter of a second parameter class into a subset comprising the at least one second equipment parameter of the parameter set of the second parameter class.

3. The device of claim 2, wherein the processor excludes a further stored vehicle configuration from a prediction in response to the further stored vehicle configuration having the first equipment parameter and a further equipment parameter allocated to the second parameter class that is excluded from the subset of the parameter set of the second parameter class.

4. The device of claim 2, wherein the processor, in response to receipt of a third equipment parameter allocated to a third parameter class different from the first parameter class, transfers the parameter set of the second parameter class into the subset of the parameter set of the second parameter class.

5. The device of claim 4, wherein the processor excludes a further stored vehicle configuration from a prediction in response to the further stored vehicle configuration having the first equipment parameter, the third equipment parameter and a further equipment parameter allocated to the second parameter class and excluded from the subset of the parameter set of the second parameter class.

6. The device of claim 1, wherein the interface device provides a query signal with information on a parameter set comprising the first equipment parameter for the user.

7. The device of claim 1, wherein the processor receives a correction signal and, in response to receipt of the correction signal, changes the correlation of the first equipment parameter selected by the user and the at least one second equipment parameter.

8. The device of claim 1, wherein the correlation values between equipment parameters are dependent on a frequency that the vehicle configuration has been selected over a predetermined time period.

9. A system, comprising:
a device for configuring a vehicle, the device comprising an interface device to receive at least one first equipment parameter selected by a user of the vehicle, a data memory to store a plurality of permissible vehicle configurations and corresponding vehicle models that have the plurality of permissible vehicle configurations, each of the plurality of permissible vehicle configurations having a plurality of mutually combinable vehicle equipment parameters; and
a processor to predict a vehicle configuration to be selected by the user from the plurality of permissible vehicle configurations based on a correlation of the at least one first equipment parameter input by the user and at least one second equipment parameter, the vehicle configuration to be selected by the user having the first equipment parameter input by the user and the at least one second equipment parameter,
wherein the processor selects a stored vehicle configuration having the first equipment parameter and the at least one second equipment parameter as the vehicle configuration to be selected by the user in response to a correlation value of the first equipment parameter and the at least one second equipment parameter corresponding to a greater transition probability value than a correlation value of the first equipment parameter and a third equipment parameter,
wherein the processor controls the prediction based on predetermined dependencies via a probability distribution of vehicle equipment parameters comprising at least one of a navigation system, a radio, and a multifunction steering wheel, and
wherein the processor further generates a visual representation of the predicted vehicle configuration along with alternative vehicle configuration proposals; and
a programmable device comprising a further interface device which provides the first equipment parameter for the interface and receives the predicted vehicle configuration from the processor.

10. The system of claim 9, wherein the correlation values between equipment parameters are dependent on a frequency that the vehicle configuration has been selected over a predetermined time period.

11. A method for configuring a vehicle, the method comprising:
receiving at least one first equipment parameter input by a user of the vehicle;
storing a plurality of permissible vehicle configurations, each of the plurality of permissible vehicle configurations having a plurality of mutually combinable equipment parameters of the vehicle; and predicting via a processor a vehicle configuration and a corresponding vehicle model to be selected by the user from the plurality of permissible vehicle configurations and vehicle models on a basis of a correlation of the first equipment parameter input by the user and at least one second equipment parameter, the vehicle configuration to be selected by the user having the first equipment parameter input by the user and the at least one second equipment parameter, wherein the processor selects a stored vehicle configuration having the first equipment parameter and the at least one equipment parameter as the vehicle configuration to be selected by the user in response to a correlation value of the first equipment parameter and the at least one second equipment parameter corresponding to a greater transition probability value than a correlation value of the first equipment parameter and a third equipment parameter, wherein the processor controls the prediction based on predetermined dependencies via a probability distribution of vehicle equipment parameters comprising at least one of a navigation system, a radio, and a multifunction steering wheel, wherein the processor further generates a visual representation of the predicted vehicle configuration along with alternative vehicle configuration proposals.

12. The method of claim 11, wherein the correlation values between equipment parameters are dependent on a frequency that the vehicle configuration has been selected over a predetermined time period.

13. A non-transitory computer program product containing instructions stored in a memory, for performing a method for configuring a vehicle when executed on a computer, a processor or a programmable hardware component, causes the computer, the processor or the programmable hardware component to:

receive at least one first equipment parameter input by a user of the vehicle;

store a plurality of permissible vehicle configurations, each of the plurality of permissible vehicle configurations having a plurality of mutually combinable equipment parameters of the vehicle; and predict a vehicle configuration and a corresponding vehicle model to be selected by the user from the plurality of permissible vehicle configurations and vehicle models on a basis of a correlation of the first equipment parameter input by the user and at least one second equipment parameter, the vehicle configuration to be selected by the user having the first equipment parameter input by the user and at least the second equipment parameter, control the prediction based on predetermined dependencies via a probability distribution of vehicle equipment parameters comprising at least one of a navigation system, a radio, or a multifunction steering wheel, select a stored vehicle configuration having the first equipment parameter and the at least one second equipment parameter as the vehicle configuration to be input by the user in response to a correlation value correlation of the first equipment parameter and the at least one second equipment parameter corresponding to a greater transition probability value than a correlation value of the first equipment parameter and a third equipment parameter, and generate a visual representation of the predicted vehicle configuration along with alternative vehicle configuration proposals.

14. The non-transitory computer program product of claim 13, wherein the correlation values between equipment parameters are dependent on a frequency that the vehicle configuration has been selected over a predetermined time period.

* * * * *